United States Patent [19]

Rakestraw

[11] 3,754,382
[45] Aug. 28, 1973

[54] METHOD AND APPARATUS FOR ORIENTING AND HARVESTING TOBACCO LEAVES

[76] Inventor: Robert H. Rakestraw, Rt. 3, Madison, N.C.

[22] Filed: Feb. 18, 1970

[21] Appl. No.: 12,291

Related U.S. Application Data

[63] Continuation-in-part of Ser. No. 871,576, Nov. 5, 1969, abandoned, which is a continuation of Ser. No. 602,823, Dec. 19, 1966, abandoned, and a continuation-in-part of Ser. No. 845,647, July 9, 1969, abandoned, which is a continuation of Ser. No. 678,396, Oct. 26, 1967, abandoned.

[52] U.S. Cl. .............................................. 56/27.5
[51] Int. Cl. ............................................ A01d 45/16
[58] Field of Search ..................................... 56/27.5

[56] References Cited
UNITED STATES PATENTS 3,453,815  7/1969  Harrington et al. ................. 56/27.5
3,178,873  4/1965  Meyer ................................. 56/27.5
3,507,103  4/1970  Pickett et al. ....................... 56/27.5

FOREIGN PATENTS OR APPLICATIONS 204,773  4/1968  U.S.S.R. .............................. 56/27.5

Primary Examiner—Robert W. Michell
Assistant Examiner—A. Heinz
Attorney—David Rabin

[57] ABSTRACT

A mobile tobacco leaf harvester and a method of harvesting tobacco leaves employing mechanical and fluid means to orient and align tobacco leaves before they are stripped or severed from around the full circumference of the plant stalks and for displacing the harvested leaves in a generally uniform manner to collection receptacles.

13 Claims, 20 Drawing Figures

Patented Aug. 28, 1973

INVENTOR
ROBERT H. RAKESTRAW

INVENTOR
ROBERT H. RAKESTRAW

INVENTOR
ROBERT H. RAKESTRAW

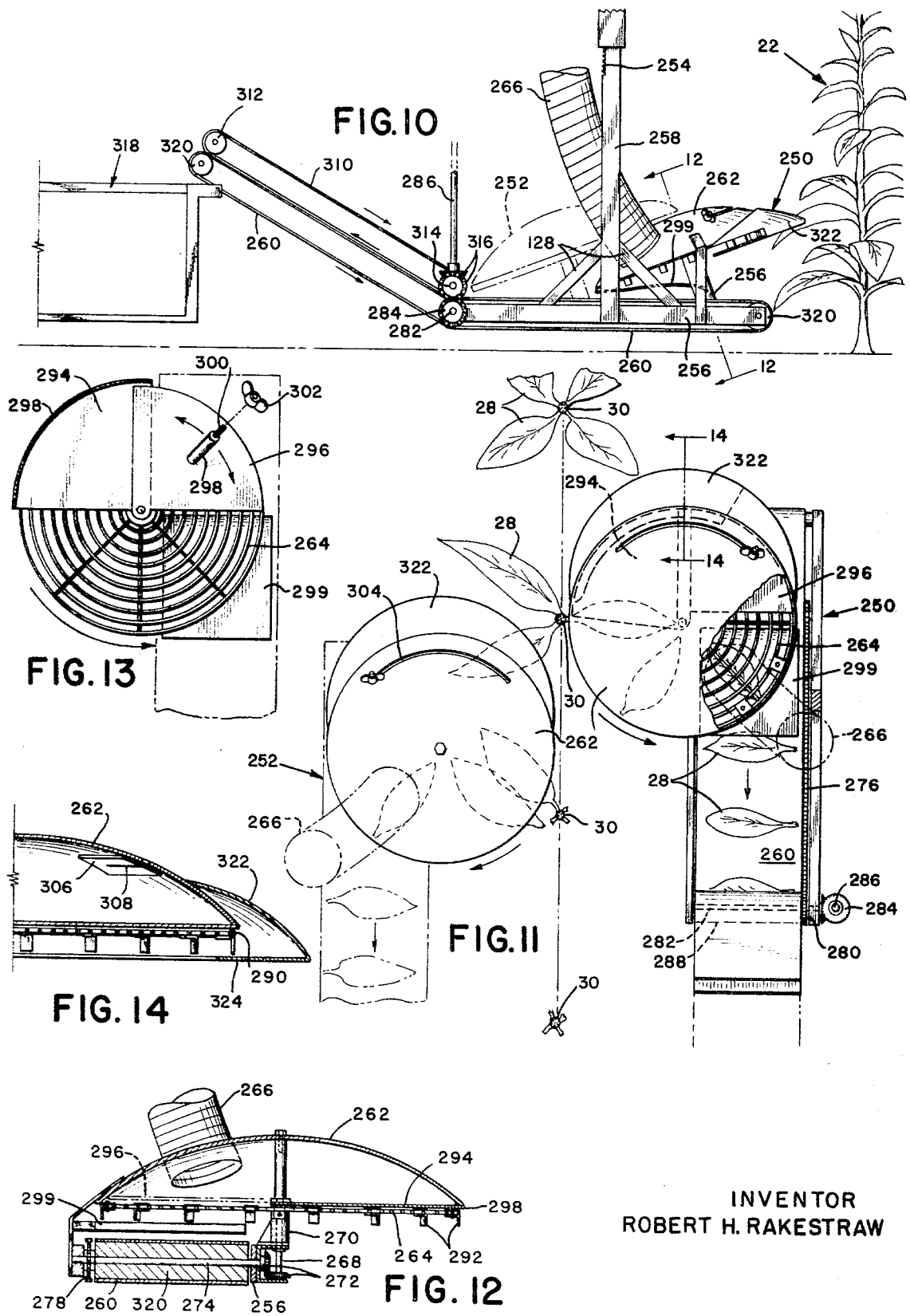

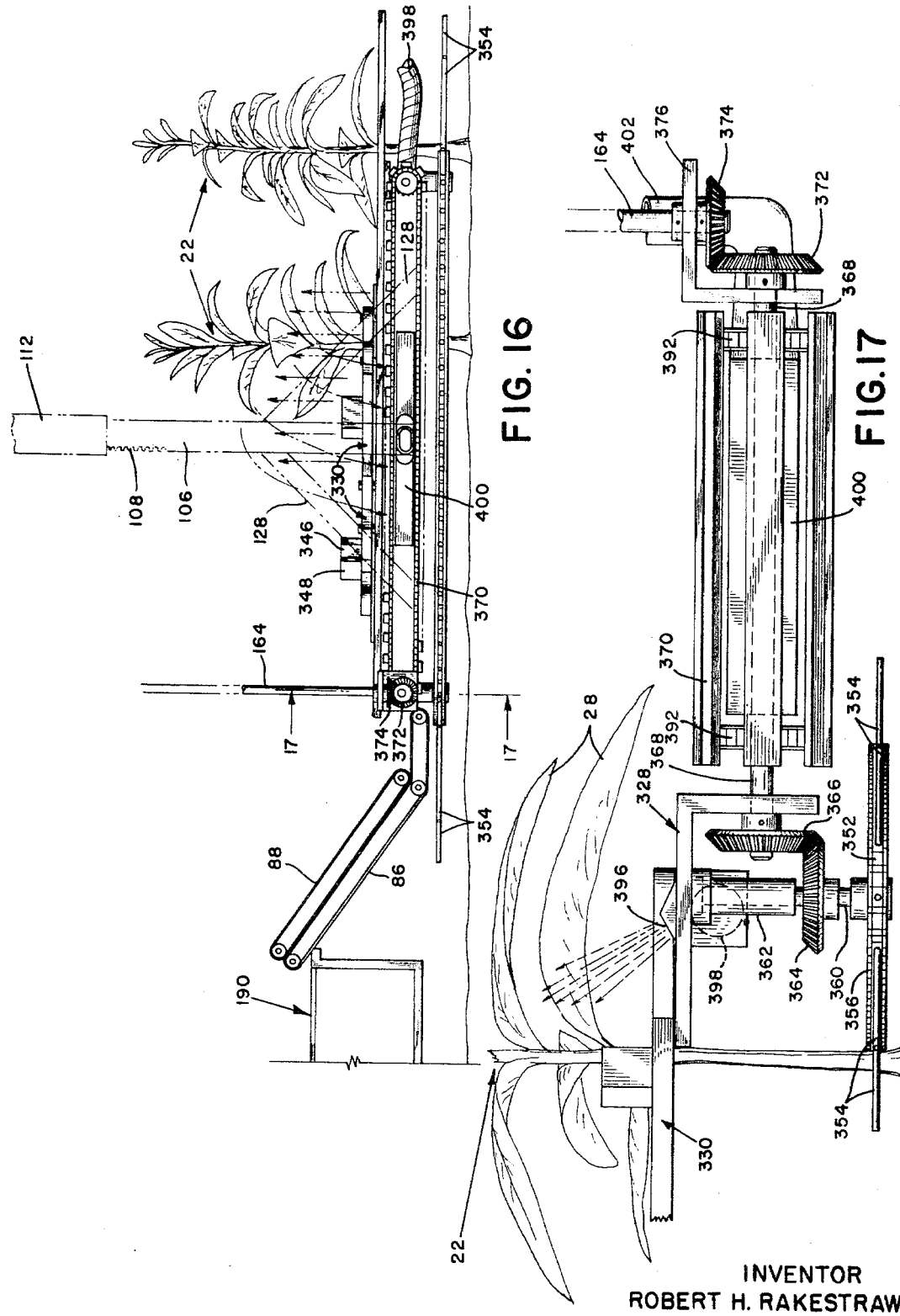

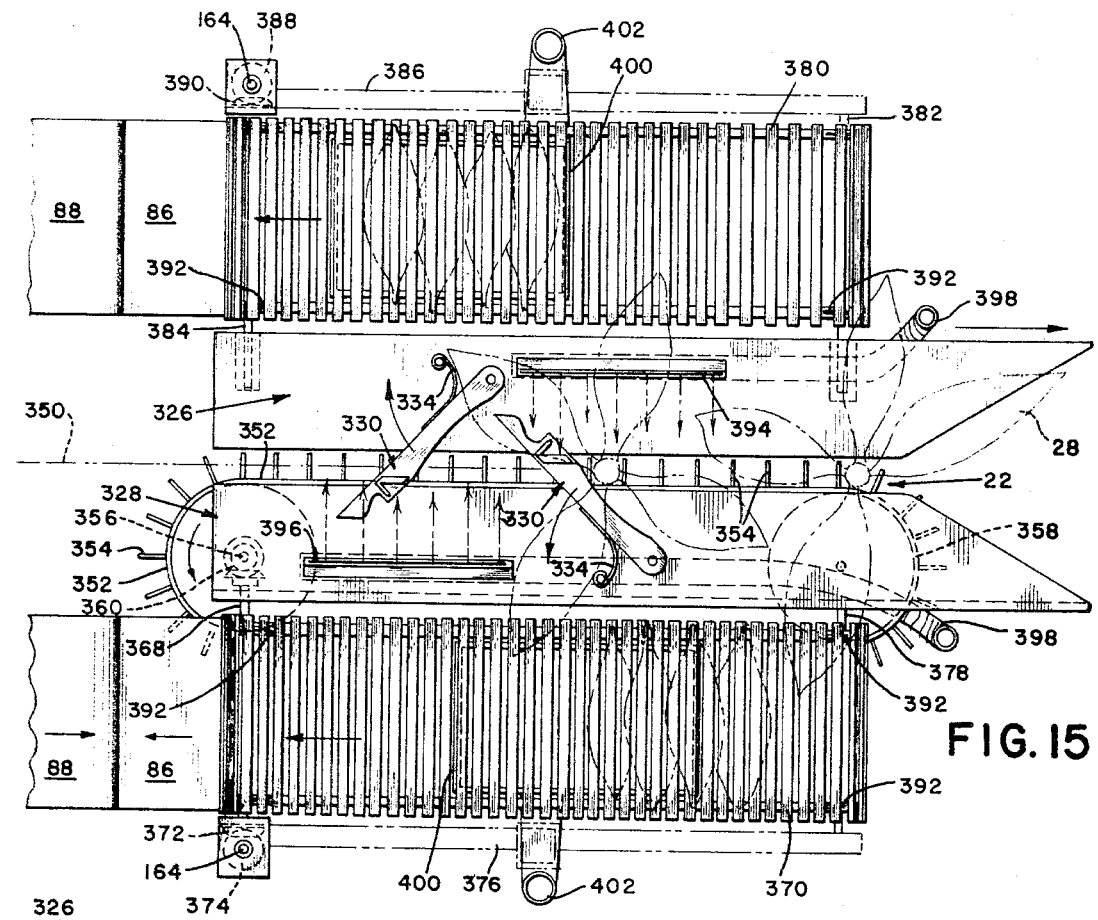
FIG. 15
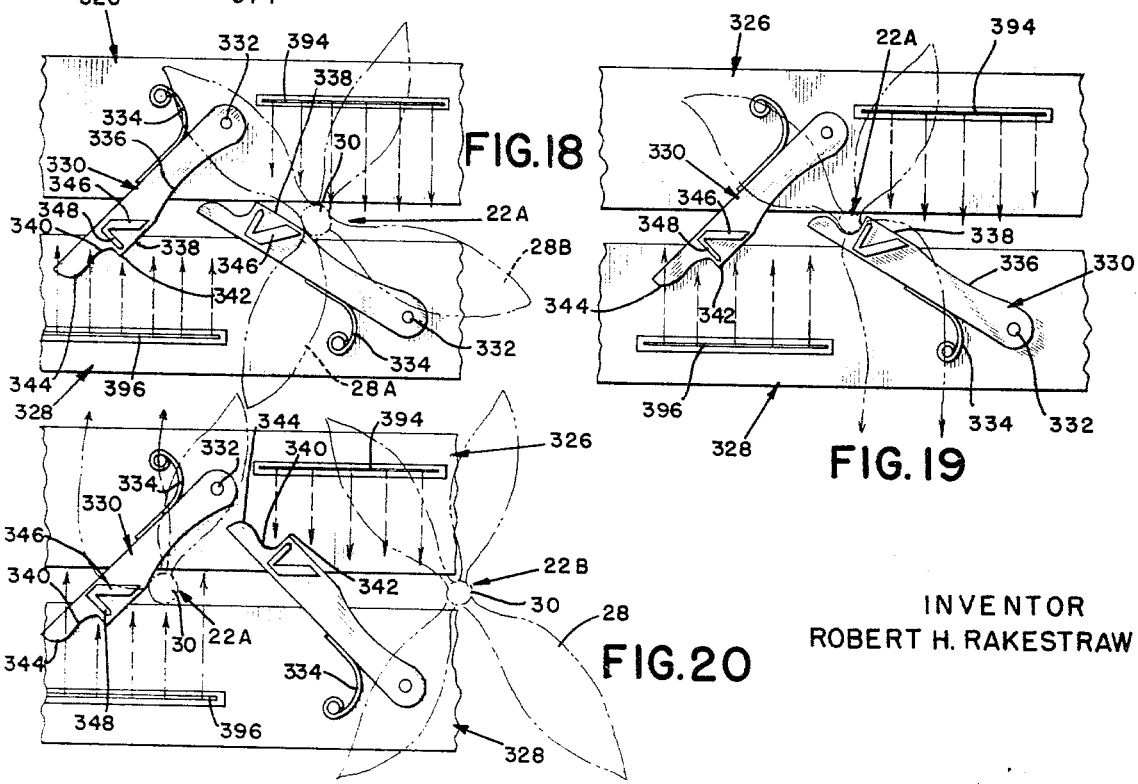
FIG. 18
FIG. 19
FIG. 20
INVENTOR
ROBERT H. RAKESTRAW

METHOD AND APPARATUS FOR ORIENTING AND HARVESTING TOBACCO LEAVES

This application is a continuation in part of copending application Ser. No. 871,576 filed Nov. 5, 1969, now abandoned, for TOBACCO LEAF HARVESTING APPARATUS which is a streamlined continuation of application Ser. No. 602,823 filed Dec. 19, 1966, now abandoned, and also a continuation in part of copending application Ser. No. 845,647 filed July 9, 1969 now abandoned for TOBACCO LEAF HARVESTING AND ORIENTING APPARATUS which is a streamlined continuation application of Ser. No. 678,396 filed Oct. 26, 1967, now abandoned. Application Ser. No. 678,396 contained some subject matter in common with application Ser. No. 654,471, filed July 19, 1967 now U.S. Pat. No. 3,439,793, for CONVEYING AND ORIENTATION APPARATUS PARTICULARLY FOR TOBACCO LEAVES.

BACKGROUND, BRIEF SUMMARY AND OBJECTS OF THE INVENTION

This invention relates to a novel method and apparatus for orienting and harvesting tobacco leaves. More particularly the present invention relates to a method and apparatus for harvesting individual leaves from rows of tobacco plants by orienting the leaves in a prescribed manner, stripping the leaves from the stalks of the plants and collecting the harvesting leaves in a substantially uniform manner.

Heretofore, apparatus has not been available for orienting and harvesting tobacco leaves in the field in a smooth and efficient manner. One of the primary deficiencies of known prior art machines has been the inability of such machines to remove leaves from around the entire circumference of the standing tobacco stalks. Another deficiency of the prior art machines is the inability of such machines to properly position the leaves in a manner to facilitate removal of the leaves from the stalks and to collect the harvested leaves in an orderly, uniform manner. These and other deficiencies have rendered the prior art machines impractical.

Briefly this invention includes a wheeled, self-propelled framework movable longitudinally of the tobacco plant rows. Leaf orienting and stripping units capable of straddling a row of plants act upon the plants to remove all leaves therefrom at a given elevation on the plants. The leaf orienting and stripping units are vertically adjustable to different heights to remove leaves substantially throughout the entire height of the plants. Each unit employs fluid means and mechanical means to remove leaves from the stalks and place such harvested leaves on a take-away conveyor with the leaf stems generally facing in the same direction.

One of the primary objects of the invention is the provision of an apparatus and method for efficiently harvesting tobacco leaves from a row of plants by stripping individual leaves and aligning the leaves in a substantially uniform manner for collection.

Another object of the invention is a system for harvesting leaves around the entire circumference of the plant stalks and orienting the harvesting leaves for collection in a uniform manner.

A further object of the invention is the provision of an apparatus which is practical and efficient in operation and not unduly expensive.

Still another object of the invention is the provision of fluid means for directing the leaves in a prescribed manner to facilitate stripping of all leaves at a preselected elevation from the plant stalks.

Other objects and advantages of the invention will become apparent from the detailed description taken in conjunction with the accompanying drawings.

BRIEF DESCRIPTION OF THE FIGURES

FIG. 10 is a schematic, fragmentary side elevational view of modified leaf aligning and removing units;

FIG. 11 is a fragmentary top plan view of the leaf aligning and removing units of FIG. 10;

FIG. 12 is a sectional view taken along line 12—12 of FIG. 10;

FIG. 13 is a fragmentary top plan view of one of the units with the hood portion removed illustrating the air blockage plates;

FIG. 14 is a cross-sectional view of the forward portion of one of the units taken along line 14—14 of FIG. 11;

FIG. 15 is a schematic plan view of further modified leaf aligning and harvesting units;

FIG. 16 is a side elevational view of the units of FIG. 15;

FIG. 17 is an enlarged, fragmentary transverse vertical section taken along line 17—17 of FIG. 16; and FIGS. 18—20 are partly diagrammatic plan views showing a sequence of operation of the leaf removing arms of the apparatus of FIGS. 15—17.

DETAILED DESCRIPTION OF THE INVENTION

Figure 1:
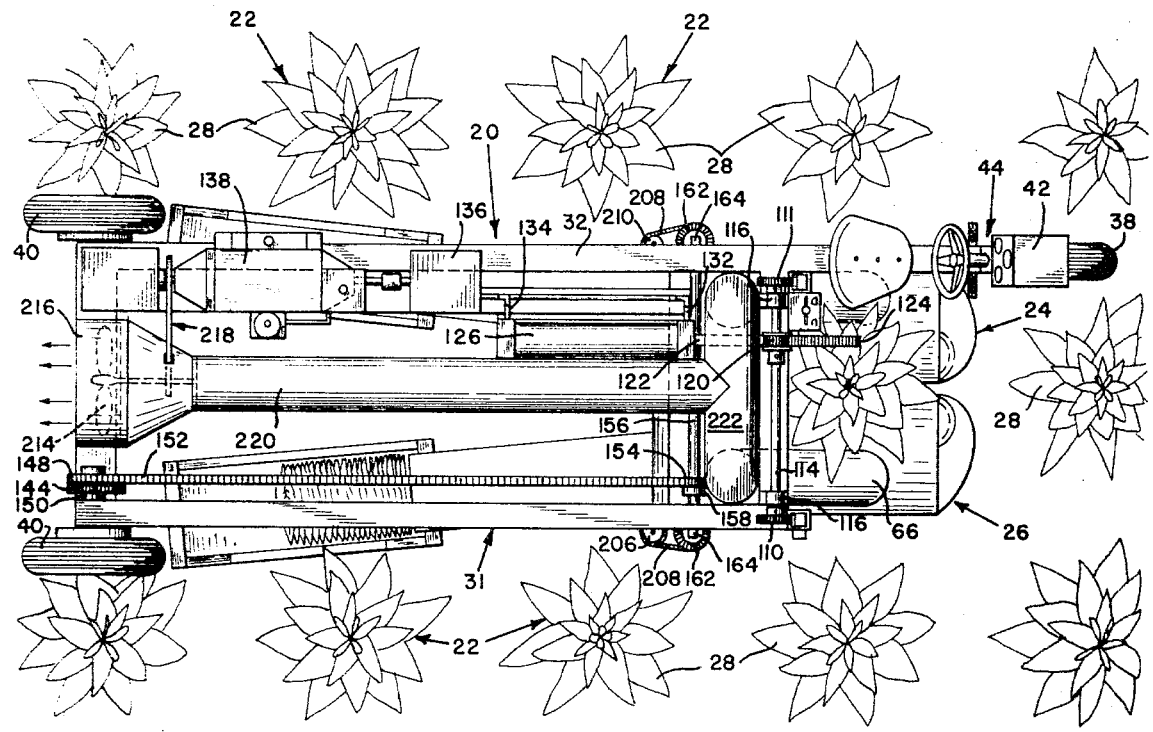
FIG. 1 is a schematic top plan view of the tobacco harvesting apparatus of the present invention positioned relative to the plant rows.
Figure 2:
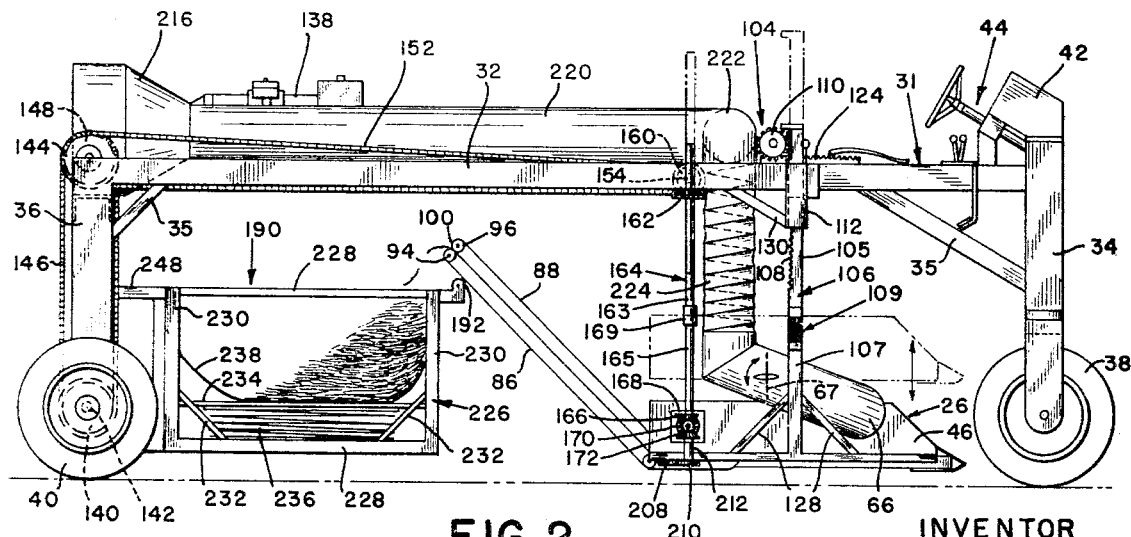
FIG. 2 is a side elevational view of the tobacco leaf harvesting apparatus of FIG. 1.
Figure 3:
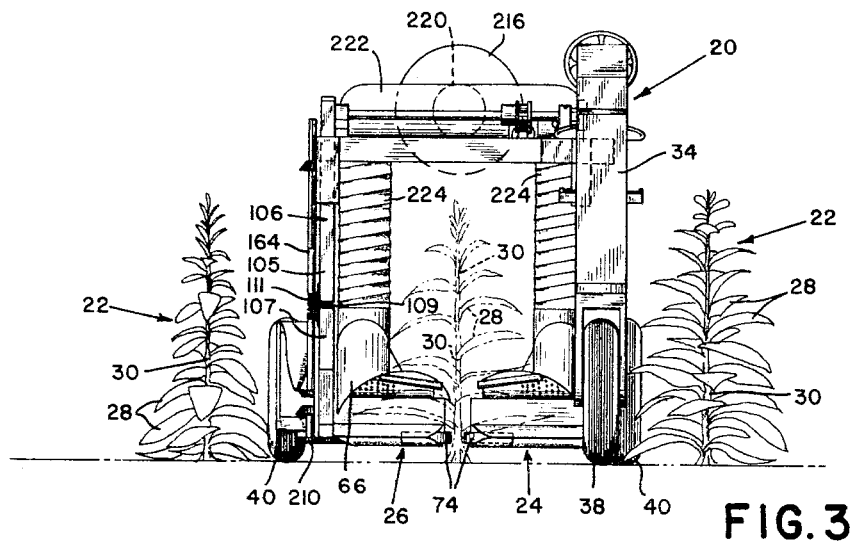
FIG. 3 is a front elevational view of the tobacco leaf harvesting apparatus of FIG. 1.

In the embodiment of the invention shown in FIGS. 1–8 of the drawing, 20 represents a mobile tobacco leaf stripping and harvesting apparatus adapted to traverse rows of standing tobacco plants 22. As shown in FIGS. 1 and 3, the appartus 20 includes a pair of substantially identical units 24 and 26 on the opposite sides of a plant row for aligning and removing leaves 28 from the plant main stalk 30. The apparatus comprises a chassis 31 including a generally rectangular frame 32 and vertically oriented support members 34, 36 secured to the forward and rearward portions, respectively, of frame 32. The rearward support members 36, 36 are laterally spaced sufficiently to receive a tobacco plant 22 therebetween while the forward support member 34 is located to one side of frame 32 and a row of plants 22 as shown by FIG. 1. The support members 34 and 36 are mounted upon front wheel 38 and rear wheels 40, 40, respectively, in a conventional manner. The frame 32 is elevated above the ground sufficiently to pass over plants 22, see FIG. 3, as the apparatus traverses a row of plants. The support members 34, 36 and frame 32 may be structurally strengthened by means of braces 35.

The forward wheel 38 is driven from a motor 42 through a suitable drive arrangement, not shown, such that a driver-operator determines the speed and direction of travel of apparatus 20 through controls 44 in a conventional manner. While FIG. 2 illustrates the driver position and controls 44 adjacent the top of frame 32, the driver-operator and controls 44, may be positioned lower on the chassis 31 for accurately controlling the alignment of the apparatus 20 with the plants 22.

As shown in FIGS. 1 and 3, the leaf aligning and removing units 24, 26 are right hand and left hand in nature but otherwise identical to enable the units to act on opposite sides of the plants simultaneously. In view of the virtual identity of the two units 24 and 26, it is anticipated that a detailed description of only one unit will suffice for a thorough understanding of the apparatus.

Figure 5:
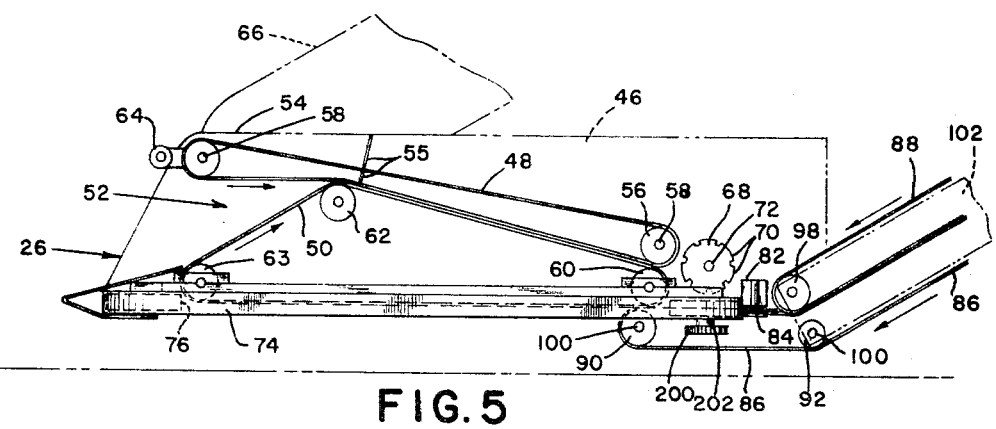
FIG. 5 is a fragmentary side elevational view of one of the conveyor arrangements for stripping the leaves and conveying the leaves to a receptacle.
Figure 6:
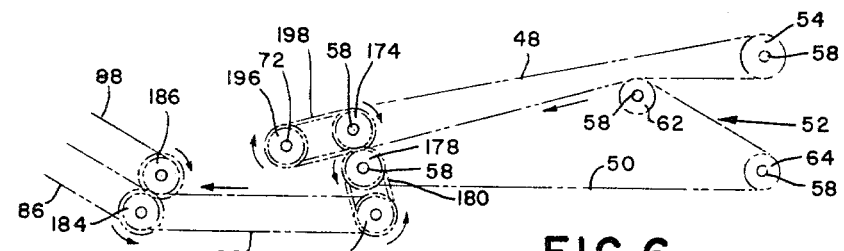
FIG. 6 is a schematic side elevational view, taken from the opposite side of FIG. 5, of the apparatus for supporting and driving the conveyor.
Figure 9:
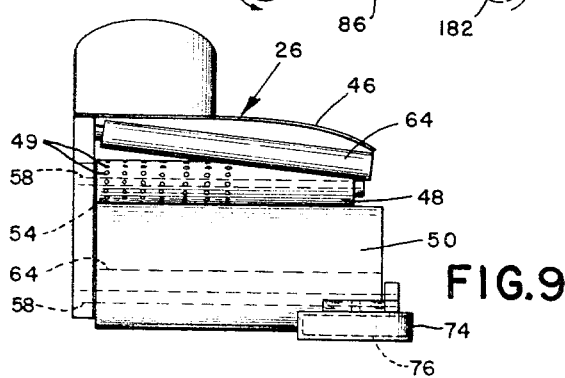
FIG. 9 is a fragmentary front elevational view of the conveyor arrangement of FIG. 5.
Figure 7:
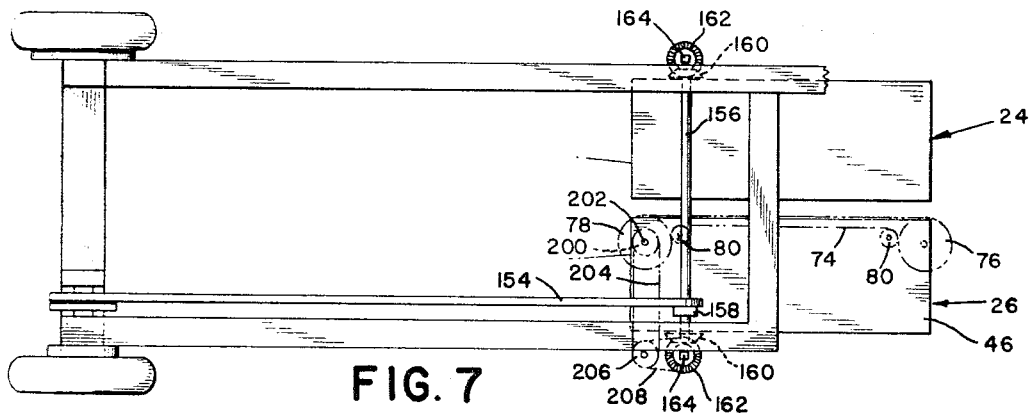
FIG. 7 is a fragmentary top view of the drive mechanism for the conveyors.
Figure 4:
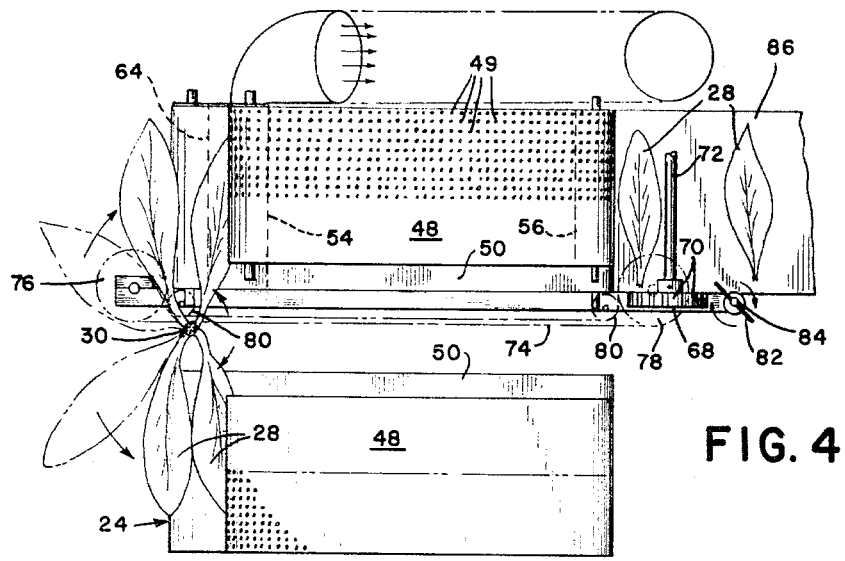
FIG. 4 is a fragmentary, top plan view of the suction and conveyor arrangements positioned on opposite sides of the plants for stripping tobacco leaves from the plant stalks.

Proceeding with a detailed description of one leaf aligning and removing unit, the unit 26 includes a generally rectangular housing 46 for supporting a conveyor arrangement and a fluid conduit. The conveyor arrangement includes belts 48 and 50 having the forward ends angularly disposed relative to each other to form a generally V-shaped opening 52 between the belts. The belt 48 extends around idler rollers 54 and driven roller 56 which are mounted on shafts 58. Belt 50 passes over driven roller 60 and idler rolls 62 and 63 which are mounted in a generally triangular configuration for rotation with shafts 58. Belt 48 is substantially narrower in width than belt 50 and is perforated, as shown in FIG. 4, for purposes to be described later. Substantial portions of belts 48 and 50 are in frictional engagement with each other between roller 62 and rollers 56, 60 as shown by FIGS. 5 and 6. An opening, not shown, is provided in each housing 46 for receiving a section of conduit 66. A driven member 68 having a series of axially directed lugs 70 thereon is mounted on shaft 72 at one end of belts 48, 50 adjacent rollers 56, 60 for a purpose to be described hereafter. Alternatively, the member 68 could be mounted upon and driven from the rearward most shaft 58 which supports belt 48.

A vertically disposed belt 74 positioned adjacent the inner edge portion of each rectangular housing 46 passes around pulleys 76, 78 for small idler pulleys 80, 80 and normally engages the stalks 30 of tobacco plants for stabilizing the plants as the apparatus 20 is conveyed along the row of plants. The opposed belts 74, mounted close to the ground in opposed relationship on the inner edge portions of units 24 and 26, engage the stalks 30 to steady the plants and maintain them erect during the leaf harvesting process. Also, the belts 74 urge and align the units 24, 26, which are pivoted with respect to the frame 32, with the plant row in the event the apparatus 20 is not accurately aligned with the plant stalks. The belts 74, which are normally disposed in a horizontal plane, more rearwardly or oppositely and at the same speed as the forward speed of apparatus 20 so that the belts 74 have zero velocity relative to the stalks 30 with which they are engaged. This permits the pair of belts 74, 74 to assist supporting or stabilizing a given plant as the apparatus 20 traverses the row.

A small paddle member 82 supported upon a pulley 84 is mounted rearwardly of the member 68 having lugs 70 thereon. The paddle 82 is driven in a clockwise direction, FIG. 4, by the pulley 84 which is drivingly engaged with the peripheral edge of a conveyor belt 86, for gleaning and displacing leaves that may be misaligned towards the center of conveyor belt 86. Conveyor belt 86 cooperates with conveyor belt 88 to direct the stripped leaves 28 longitudinally of the apparatus 20 to a collection receptacle supported on the chassis 31 forwardly of the rear wheels 40. Belt 86 passes around spaced rollers 90, 92, 94 and belt 88 around rollers 96, 98. Each of the rollers 90, 98 is mounted for rotation on a shaft 100 secured to the conveyor frame 102 in housing 46.

The leaf aligning and removing units 24 and 26 are mounted for vertical movement such that the units can be adjustably positioned at prescribed elevations within a range substantially corresponding to the height of the tobacco plants. In this manner, all leaves within a designated range above ground leave are stripped from the stalks as the mobile apparatus traverses a row of plants. Thereafter, the units 24 and 26 may be raised or lowered to strip leaves at other elevations above ground level until substantially all leaves have been harvested. Control means, indicated at 104 in FIG. 2, raises or lowers the units 24, 26 to position the conveyor belts 48, 50, 74 at a prescribed distance above the ground. The housing 46 of unit 26 is rigidly secured to a bar 106 having a rack 108 thereon for cooperating with a gear 110. Upon rotation of gear 110, member 106 is displaced vertically within a guide member 112 secured to the frame 32. The gear 110 is rotatably secured to shaft 114 which is supported by bearing 116 and extends transversely of frame 32. The shaft 114 is driven by a gear 120 which cooperates with rack portion 124 of a reciprocable rod 122. The rod 122 of double acting fluid cylinder 126 may be controlled by conventional means, not shown, to raise or lower the unit 26. Fluid lines 132 and 134 extend between the opposite ends of cylinder 126 and a pump 136 which is driven by motor 138. Braces 128 and 130 are provided to strengthen the securement of housing 46 to member 106 and the guide member 112 to frame 32, respectively. The unit 24 is raised and lowered simultaneously with the unit 26 by a rack which is substantially identical to rack 108 and which is displaceable upon rotation of a gear 111 secured to the end of shaft 114 opposite gear 110.

In addition to being vertically adjustable, the units 24 and 26 are mounted upon frame 32 for swinging movement to prevent damage to the plants. The plant stabilizing belts 74, which normally would contact each other in the absence of plant stalks therebetween, urge or pivot units 24 and 26 transversely of the frame 32 if the apparatus 20 becomes temporarily misaligned with the row of plant stalks. In order to permit units 24 and 26 to move relative to each other and relative to the frame 32, each support bar 106 is divided into two segments 105 and 107 connected together by a hinge or other suitable coupling means 109. A heavy spring arrangement 111 suitably connected between segments 105 and 107 normally urges the associated unit 24 or 26 to a substantially horizontal position, as shown by FIG. 3, while allowing the unit and segment 107 to pivot relative to segment 105 and frame 32. Similarly, splined shaft 164 is divided into two segments 163 and 165 which are interconnected by a flexible coupling 169 for permitting the gear box 168 and segment 165 to pivot relative to segment 163.

The various conveyor belts of the leaf aligning and conveying units 24 and 26 are driven from one of the rear wheels 40 through a series of belts and pulleys upon displacement of the apparatus 20. A pulley 140 supported upon the axle shaft 142 of one of the rear wheels 40 is driven upon rotation of the wheel to impart rotation to a pulley 144 by means of a vertically disposed belt 146. Frame 32 supports pulleys 144 and 148 which are coaxially mounted upon and fixedly secured to a stub shaft 150 rotatably supported in suitable bearings, not shown. A longitudinally extending belt 152 drives a pulley 154, which is located above unit 26, from the driven pulley 148. The pulley 154 is supported upon frame 32 by a shaft 156 mounted in spaced bearings 158, only one of which has been shown. Each end of shaft 156 has a bevel gear 160 secured thereto in meshing engagement with bevel gear 162 for driving a splined shaft 164 which passes through the gear 162 vertically. The lower end of splined shaft 164 has a bevel gear 166 secured thereon which is positioned within a suitable gear box 168 fixed to unit 26. Gear box 168 also houses bevel gears 170 and 172 in meshing engagement with gear 166. Bevel gear 170 is secured to the shaft 58 which supports roller 56. Thus it can be seen that rotation of rear wheel 40 imparts rotation to bevel gear 170 and roller 56 which in turn drives conveyor belt 48.

Figure 8:
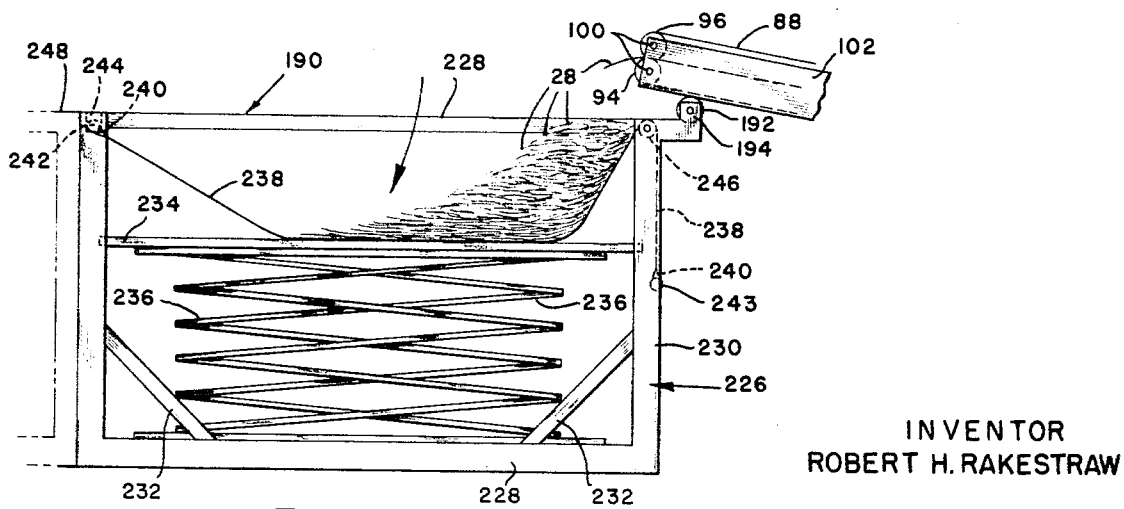
FIG. 8 is an enlarged fragmentary view, with parts removed, of one of the stripped leaf receptacles.

Referring to FIGS. 5 and 6, it can be seen that a gear 174 is mounted coaxially of roller 56 and shaft 58 for rotation therewith. The gear 174 meshes with a gear 178 mounted coaxially of roller 60 for rotation therewith. The gear 178, in turn, drives the roller 60 and belt 50 passing thereover. A belt 180 extends around a pulley, not shown, mounted coaxially of and for rotation with gear 178, and a pulley 182 for driving shaft 100 and roller 90 to impart rotation to the lower conveyor belt 86. The upper conveyor belt 88 is driven from belt 86 through meshing gears 184, 186 secured for rotation with rollers 92 and 98, respectively. Conveyor belts 86 and 88 cooperate to transfer harvested leaves 28 to a receptacle 190. The outermost end portions of conveyors 86 and 88 adjacent rollers 94 and 96 are secured to frame 102 which is supported upon a roller 192 mounted in bearings 194 upon receptacle 190. Referring to FIGS. 2 and 8, as the unit 26 is displaced vertically by control means 104 from the full line position to the dotted line position, the lowermost edges of frame 102, which supports conveyors 86 and 88, moves rearwardly upon roller 192.

The rotatable member 68 having lugs 70 thereon, is driven from shaft 72, which extends transversely of unit 26. In turn, the shaft 72 is driven from pulley 196, belt 198 and a pulley, not shown, which is mounted coaxially of and for rotation with gear 174.

The stalk engaging belts 74 are driven rearwardly at a speed corresponding to the forward speed of apparatus 20 by the pulley 78 which is secured to a shaft 202 and pulley 200. The pulley 200 is drivingly connected to bevel gear 172 mounted in gear box 168 through belt 204, double pulley unit 206, belt 208, pulley 210 and shaft 212.

Suction is applied to the tobacco leaves adjacent the belts 48 and 50 of each unit 24 and 26. Air is drawn through the perforations 49 in the outermost portion of upper belt 48 to direct leaves in the vicinity of V-shaped opening 52 radially with respect to the plant stalks and upwardly against the lower run of belt 48. The leaves held against belt 48 are fed rearwardly relative to unit 26 until they are gripped between belts 48 and 50. As an alternative, the relatively wide belt 48 may be replaced by a series of narrow belts mounted in spaced, parallel relation so that air may be drawn therethrough. Air blockage plates 55 are suitably positioned within housing 46 to retain the suction generally forwardly of roller 62 such that leaves being conveyed rearwardly between belts 48 and 50 are freely deposited upon conveyor 86. A fan 214 enclosed within housing 216 is driven by a belt and pulley arrangement 218 from the shaft of motor 138. The fan 214 is mounted on the rearward portion of frame 32 and connected to an elongated conduit 220 which extends forwardly to a location above units 24 and 26. Conduit 220 branches into a T-connection 222 which extends transversely of frame 32 and has the outer end portions turned downwardly for a connection to flexible, accordian-type sections of conduit 224. In turn, the conduit sections 66, secured to each unit 24 and 26, are connected to flexible conduits 224. Adjustable dampers or baffles 67 are located within each conduit 66 to control the flow of air therethrough. The conduit sections 224 are flexible and can be callapsed or expanded to allow vertical displacement of units 24 and 26 through racks 106 and gears 110, 111, 120 upon actuation of fluid cylinder 126. In addition to baffles 67, the flow of air through each conduit 66 can be controlled by varying the speed of motor 138 which drives fan 214.

The stripped leaves are displaced rearwardly by co-operating conveyor belts 86, 88 located rearwardly of each unit 24 and 26 to receptacles 190 positioned at each side of the mobile apparatus 20. The receptacles 190 and belts 86, 88 are disposed relative to the frame 32 as shown in FIG. 1, to provide sufficient space for a row of tobacco plants to pass therebetween.

Each receptacle 190 includes a generally open top, box-like rectangular housing 226 having horizontally 228 and vertically 230 disposed member strengthened by braces 232. The receptacle 190 has a false bottom comprising a rectangular plate 234 normally biased to a raised position adjacent the uppermost horizontal member 228 by spring means 236. As leaves 28 are accumulated in the receptacle, the increasing weight of the leaves compresses the spring, as shown in FIG. 2, until the receptacle 190 has been substantially filled. The leaves deposited in the receptacle are received upon a suitable flexible member 238 having a length greater than the length of the receptacle 190 and a width corresponding substantially to the width of receptacle 190. The ends 240 of the flexible member 238 are looped for receiving rod members 242, 243, as shown in FIG. 8. One of the rod members 242 is supported within a recess 244 for supporting the corresponding end of flexible member 238 as the receptacle is filled with leaves. The other end of the flexible member 238 is draped over a roller 246 which is secured to the housing 226 below the conveyor belts 86 and 88.

As shown by FIG. 8, the rod members 242 and 243 are weighted sufficiently such that the rod member 243 pulls the corresponding end portion of flexible material 238 downwardly due to gravity. As the weight of the leaves 28 in the receptacle increases and the false bottom 234 moves downwardly, the bar 243 is displaced vertically as further portions of the flexible member 238 are pulled over the roller and into the receptacle. Since the end of flexible member 238 is held stationary by bar 242, it can be seen that the leaves are gradually shifted to the left, FIG. 8, as additional lengths of the member 238 are drawn into the receptacle over roller 246. After the receptacle has been substantially filled, the leaves and flexible members 238 can be removed readily from the receptacle by lifting the bars 242 and 243. The rearward portion of each receptacle is supported by frame 248 which is secured to a support member 36.

While the particular size and configuration of the receptacles 190 may vary considerably, preferably they should be provided with means for depositing leaves therein in a uniform manner. For example, a conveyor arrangement, not shown, including belts similar to inclined belts 86, 88, could be positioned to deposit leaves into receptacles 190 which could be reciprocated forwardly and rearwardly in a horizonal plane beneath the discharge end of the conveyor arrangement. The discharge end of the conveyor arrangement could be supported by frame 32 to prevent interference with the movement of the receptacles. In addition, the displaceable false bottom 234 of each receptacle could be automatically controlled as leaves are deposited therein. The movement of each receptacle 190 and false bottom 234 could be controlled by cam means, fluid cylinders, or other suitable arrangements.

The operation of the tobacco leaf harvesting apparatus illustrated in FIGS. 1–8 will now be described. Before traversing a row of plants having leaves to be harvested, the leaf aligning and removing units 24 and 26 are elevated to a desired distance above the ground for removing leaves, within a prescribed range, from the stalks. The leaves at different heights on the plant may be harvested as they ripen during the harvesting season. An operator then aligns the apparatus 20 with a row of tobacco plants as shown in FIG. 3. As the apparatus 20 traverses a row of plants, the belts 74 located at the inner edge portions of opposed units 24 and 26 engage the main stalks 30 and align the units with the stalks to steady the plants during the harvesting process. The belts 74 are driven rearwardly at the same speed as the forward speed of apparatus 20 so that the belts have zero velocity relative to the stalks.

Suction is applied to the interior of housing 46 through the perforated portions of the upper belts of each unit 24 and 26 through conduits 66, 224, 222 and 220 to displace leaves on the stalks to the full line positions as shown on FIG. 4. The suction acts on opposed sides of the plants to pull the leaves radially into opening 52 between the belts 48 and 50 and upwardly against the perforated belt 48. In this manner the tobacco leaves are pre-arranged and pre-positioned by suction immediately prior to their removal of stalks 30. Once the leaves are positioned radially of the stalks, suction acting through the perforated belt 48 and conduit 66 of each unit 24 and 26 tends to clamp the leaves against belt 48. Since belts 48 and 50 are driven rearwardly at a speed corresponding to the forward movement of the mobile apparatus 20, relative movement between the pre-arranged, radially directed leaves and the belts 48, 50 which frictionally grip the leaves therebetween applies a stripping action to the leaves as the leaves are conveyed downwardly relative to the stalks due to the inclination of belts 48 and 50 between the rollers 60 and 62. In the event certain of the leaves are not stripped in this manner the lugs 70 spaced radially around the driven wheel 68 breaks the leaf stems from the stalks just prior to the leaves emerging from between belts 48 and 50. The stripped leaves then are deposited upon the horizontally disposed section of belt 86. Leaves that may be deposited against the inner edge portions of belt 86 are urged toward the center of the belt by the driven paddle 82. The leaves deposited on the extended, horizontal portion of belt 86 are gripped between the belts 86 and 88 and conveyed to the receptacle 190. As leaves are deposited in the receptacle they shift to the rear or left of the housing 226, FIG. 8, due to the increasing weight which compresses spring means 236.

Guide rollers 64 are positioned adjacent the uppermost forward portions of units 24 and 26 for penetrating through the plant leaves upon displacement of the units to separate, direct and guide leaves, located just above the leaves within the area or range to be harvested, over the units 24 and 26, and to direct leaves to be harvested toward belts 48, 50.

As an alternative to the embodiment of FIGS. 1–9, large driven paddles, not shown, similar to the paddle 82 of FIG. 2, may be provided within units 24 and 26 for harvesting leaves from the plant stalks. The paddles would be positioned within housings 46 and rotatable about horizontal axes.

FIGS. 10–14 discloses modified leaf aligning and removing units 250, 252 capable of straddling a row of tobacco plants 22. Each unit includes leaf orientation and removal components staggered longitudinally of a tobacco plant row so as to be capable of acting on the opposite sides of two plants in a row simultaneously to ultimately remove and orient all leaves at a given elevation on the plants. The orientation and removal components employ suction and mechanical elements in combination to effect the removal of leaves cleanly from the stalks and the placement thereof on take-away conveyors. The opposed units 250 and 252 are substantially identical and staggered longitudinally of their row of plants thus enabling the units to act on two plants simultaneously but not on both sides of one plant simultaneously. Units 250, 252 are supported for swinging movement and vertical adjustment on a mobile frame 20 such as disclosed in the embodiment of FIGS. 1–9.

The unit 250 includes a rigid frame 256 secured to bar member 258 for supporting a leaf take-away conveyor belt 260 whose upper run travels in the direction of the arrow, FIG. 11. As will be fully explained, the leaves are cleanly removed from the plant stalks and placed on the belt 260 in oriented relation with the leaf stems extending generally in one direction transversely of the belt as indicated by FIG. 11 or alternately longitudinally of the belt, if desired. Unit 250 further includes an upwardly convex hood or shield 262 formed of plastic, sheet metal or the like which is smoothly rounded to penetrate through and under the plant leaves and between the rows of plants. This hood or shield prevents the leaves on the plants above the elevation of those being harvested at a particular time from becoming entangled in the unit. A single pass of the apparatus along a row removes the leaves only at a certain region or elevation. Therefore, the units 250 and 252 necessarily are vertically adjustable in a conventional manner, for example, by racks 254 which cooperate with control means 104 and fluid cylinder 126 as taught in the embodiment of FIGS. 1–9 so that leaves may be harvested at different heights on the plants as they ripen.

The hood 262 is essentially open at the bottom except for a driven rotating grill 264 and associated elements to be described, and a suction conduit 266 is connected to the top of the head toward the rear and outer side relative to the row of plants. Suction conduit 266 leads to and is connected to a suitable source of suction, as disclosed by FIGS. 1 and 2.

The grill 264 preferably consists of a series of spaced concentric bars and is secured at its center to a drive shaft 268 suitably journaled in bearing means 270 rigid with frame 256. The shaft 268 is driven at its lower end by a pair of bevel gears 272, one of which is connected with a cross shaft 274. Shaft 274 is driven by a chain 276 and sprockets 278, 280 from a shaft 282, which in turn is driven through gear 284 and bevel gears 316 from shaft 286. Shaft 286 corresponds to shaft 164 in the embodiment illustrated by FIGS. 1–9. Shaft 282 also drives roller 288 of conveyor belt 260. The grill 264 turns with the shaft 268 relative to hood 262 which is secured to frame 256. Preferably, the rim or periphery of the metal grill 264 is provided with a rubber guard or cushion 290 secured thereto in any suitable manner. This guard protects the plant stalks against bruising and aids in stripping or removing the tobacco leaves from the stalks.

Near the periphery of the rotating grill 264 are a plurality of circumferentially equidistantly spaced rather stiff rubber lugs 292 which revolve with the grill and aid in the removal of leaves 28. The lugs 292 are attached to the grill by suitable means and project below the inclined grill and hood. However, the lugs do not project beyond the grill periphery, as shown by FIG. 12.

Associated with the grill 264 and hood 262 are fixed and adjustable air blockage plates 294 and 296, each having an opening to receive the top of shaft 268 pivotably and each adapted to cover approximately one-fourth of the rotating grill. The fixed plate 292 may have its curved edge 298 suitably anchored to the hood 262 for support close to and above the grill 264. The adjustable plate 296 lies immediately above the plate 274 and is pivoted about shaft 268 and can be adjusted around the axis of the shaft to produce the desired coverage of grill 264 to thereby regulate the release of tobacco leaves carried by the bottom of the grill under the influence of suction and the hood 262 after removal of leaves from the plants. The adjustable plate 296 carries an upwardly inclined arm 298 rigid therewith having a reduced threaded portion 330 carrying a clamping wing nut 302. The reduced portion 300 operates through an arcuate adjustment slot 304 and the convex hood 262. An air seal is formed for slot 304 by an interior rubber strip 306 having a slit 308 formed therein receiving the reduced portion 300 of arm 298. By loosening clamping nut 302 and removing portion 300 through slot 304, the air blockage plate 296 may be moved circumferentially with respect to fixed plate 294 and rotating grill 264 to adjust the area of air blockage through the grill and thereby regulate the release of tobacco leaves 28 adhering to the bottom of this grill by the effective suction within hood 262. By adjusting the plate 296, the leaves may be deposited on the take-away belt 260 either transversely oriented as shown in FIG. 11 or longitudinally oriented.

The leaves deposited on the take-away conveyor 260 travel in the direction of the arrow X which is opposite to the direction of rotation of grill 264. In order to prevent leaves that have been deposited on belt 260 from being pulled upwardly by suction against the rotating grill, a plate 299 is secured to members 128 and 256 intermediate the grill and the belt 260, as shown by FIG. 12. As a leaf, held by suction against the revolving grill above plate 299, reaches air blockage plate 296, suction is interrupted releasing the leaf from the grill and permitting it to fall onto conveyor 260. As the leaf is displaced by conveyor 260 in the direction of the arrow X, it passes below air blockage plate 299 preventing the leaf from again being pulled into engagement with the grill.

A conveyor belt 310, supported by rollers 312 and 314 and driven through bevel gears 316 from shaft 286, cooperates with belt 260 to convey the leaves to a collection receptacle 318, shown schematically in FIG. 10, which corresponds to the receptacle 190 of FIGS. 2 and 8. Belt 260 is supported upon driven roller 288 and a plurality of idler rollers 320.

Each hood 262 has a leading crescent-shaped projection or nose 322 formed thereon which aids the apparatus in penetrating through the leaves without damaging the tobacco plants. One one side or quadrant of hood 262, namely the forward quadrant nearest the plant row, there is a leaf protector ledge 324 on the bottom of nose 322 disposed below lugs 292, FIG. 14. During turning of the grill 264, the lugs 292 which aid in the removal of leaves pass above the ledge 324 and are prevented from engaging any leaves while the particular unit 250 is penetrating through the leaves and moving to the proper harvesting position directly at the side of the plant. At this time, the lugs 292 emerge from their enclosed positions above ledge 324 and are exposed so that they may engage the stems of the leaves near the main stalk 30 to aid in leaf removal.

Considering a single unit 250 of the apparatus, the unit moves forwardly along a plant row with the grill 264 turning slowly in the direction of the arrows, FIGS. 11 and 13, whereby the interior peripheral edge of the grill is moving opposite to the forward movement of a unit or mobile support frame and a slightly faster speed. Therefore, the lugs 292 are moving rearwardly somewhat relatively to the stalks 30 and leaf stems while directly opposite the same. The rubber guard also moves rearwardly with the grill 264 and is inclined to the horizontal and has the same rearward relative movement with respect to the plants. At this time there is suction created within the hood 262 through conduit 266 and this suction is effective through the rotating grill tending to pull the leaves on one side of the plant radially over toward the center of the grill and under the grill, the leaf stems simply bending to permit this action. In this manner the tobacco leaves are prearranged or prepositioned by suction immediately prior to their removal from the stalks.

There are three separate forces or elements working together to assure that the leaves 28 will separate from the main stalk 30. First, the forward movement and rearward turning of the grill 264 with guard 290 will engage the leaf stems and tend to strip them downwardly from the main stalk. Secondly, the suction force holding the leaves 28 to the rotating grill will act to remove the leaves, and thirdly, when one of the lugs 292 turning with the grill reaches a leaf stem, there will be a bending or snapping action of the stem by engagement with the lug further aiding in removing the leaf from the plant. These three forces will act together to remove the leaves at one side of the plant with efficiency and without damaging the leaves. The opposite unit 252 will accomplish the same results on the other side of the plant. The purpose for staggering the two units is to prevent any possibility of suction from one unit working against the suction of the opposite unit.

At the same time of leaf removal from the main stalk, all leaves are arranged generally radially inwardly on the revolving grill and the grill carries the harvested leaves to the side of the unit beneath which the conveyor belt is disposed. At this point, depending upon the adjustment of the air blockage plate 296, the suction will be interrupted through the grill and each leaf in succession on the grill will be released from the grill and will drop onto the take-away conveyor in a generally oriented relation, that is, with the leaf stems facing in a more or less uniform direction, either longitudinally or transversely. If plate 296 is shifted to substantially cover the forward outside quadrant of the grill, the suction will be broken when the leaves reach a point substantially transverse to belt 260. If the plate 296 is adjusted to lie on top of fixed plate 294, thereby uncovering the forward outside quadrant of the grill, the suction will not be broken and the leaves will not be released for dropping onto the belt until they reach positions where they extend substantially longitudinally of the belt. Thus, the manner of orienting the leaves can be advantageously adjusted between rather wide limits.

The units 250 and 252 cooperate to harvest or prime and orient leaves on opposite sides of the plants at a given elevation and the units are adjustable vertically, as previously stated. A single removing instrumentality thus serves to remove the tobacco leaves from the plants and to orient them in a continuous smooth operation.

Referring now to FIGS. 15-20 of the invention, there is disclosed still another modified embodiment of the leaf aligning and harvesting units. Numerals 326 and 328 designate companion laterally spaced parallel horizonal main frame members which extend longitudinally of the mobile frame and upon which the various components are mounted and supported. The members 326 and 328 are themselves suitably supported intermediate their ends by bars 106 of the mobile frame 20 for propelling the apparatus along rows of tobacco plants. As may be observed from FIG. 15, during forward movement of the mobile frame along a plant row, the tobacco plants 22 enter between the frame members 326 and 328 which are at a relatively low elevation, FIG. 17.

Pivotably mounted upon the frame members 326 and 328 in diagonally oppositely disposed relation are harvesting arms 330 whose corresponding ends are pivoted to the frame members 326 and 328 on pins 332 near the longitudinal center and the forward end portions of members 326 and 328, respectively. The arms 330 are urged constantly to the diagonal positions shown in FIG. 15 by springs 334, suitably anchored to the members 326 and 328. These springs yield during the operation of the apparatus to permit the two harvesting arms 330 to swing rearwardly in the direction of the arrow, FIG. 15. The arms operate in a horizontal plane and each arm substantially spans the passage between frame members 326 and 328.

For purposes to be described, each arm 330 has a shallow curved recess 336 and its forward side extending from a point near its pivoted end and along a substantial portion of the length of the arm 330. This recess leads to a straight edge portion 330 of lesser length, in turn leading to a more abrupt shallow curved recess 340 near the free end of the arm preceded by a square corner 342. The curved recess 340 terminates in a relatively narrow reversely curved cam-like extension 344 on the free end of harvesting arm 330. The reverse side of the arm may be straight, as shown. Adjacent the straight edge portion 338 of each arm and on the top thereof are a pair of forwardly diverging leaf stem breaking or severing elements 346 and 348 having beveled leading edges which may be termed knives. The element 346 extends parallel to the direction of movement of the mobile frame and the element 348 extends diagonally of the direction of movement, substantially at right angles to the straight edge portion 338. Element 348 lies close to corner 342 and recess 340 and the element 346 lies close to the adjacent end of the recess 336. As shown in FIG. 15, the elements 346, 348 of the two arms 330 are oppositely disposed with respect to the theoretical longitudinal center line 350 of the apparatus and plant row, the parallel elements 346 being close to the center line, as shown. The pair of harvesting arms 330 together constitute a very important part of the invention apparatus and are very significant in this improved mode of operation, to be described.

The apparatus further embodies means to engage the main stalks 30 of the plants 22 and to steady the plants and hold them erect during the harvesting process. This means comprises horizontal endless flexibile conveyor element 352 arranged directly under the main frame member 328 and extending lengthwise thereof quite close to the ground, FIG. 17. Conveyor element 352 carries a plurality of equidistantly spaced equal length laterally projecting plant stabilizing fingers 354. These fingers, which are resilient, move in a horizontal plane and intermesh with the plant stalks 30. As the apparatus moves forward along a row of plants, the stabilizing fingers 354 at the inner edge of the frame member 328 move rearwardly or oppositely and at the same speed of movement as the forward movement of the apparatus so that the fingers will have zero velocity relative to the plant stalks with which they are engaged. This enables a given pair of fingers 354 to aid in supporting or stabilizing a given tobacco plant as the apparatus traverses a plant row. The direction of movement of the fingers is indicated by arrows in FIG. 15.

The flexible conveyor element 352 engages pulleys 356 and 358 near the rear and forward ends of frame member 328, the pulley 356 being secured to a vertical shaft 360 journaled in a bearing 362 depending upon the frame 328. The rotary shaft 360 carries a bevel gear 364 meshing with a bevel gear 366 secured to a transverse horizontal shaft 368 projecting laterally outwardly of frame 328. The shaft 368 serves as a drive shaft for one horizontal endless slatted conveyor 370 which extends longitudinally along one side of the apparatus close to frame member 328 with its top run adapted to travel rearwardly during the operation of the apparatus. The shaft 368 is driven through bevel gears 372, 374. The bevel gears 372, 374 are suitably mounted on frame member 376. An idler shaft 378 supports the forward end of conveyor 370, the shaft 378 being suitably supported by members 328 and 376.

Alternatively, the conveyor element 352 and fingers 354 which engage and stabilize the plant stalks may be replaced by stabilizing belts 74, as disclosed in the embodiment of FIGS. 1-8. A horizontally disposed belt 74 would be mounted upon each of the frame members 326 and 328 for engaging the stalks 30.

A like horizontal longitudinal leaf conveyor 380 is mounted upon the opposite side of mobile frame 20 by means of idler shaft 382 and driven shaft 384, each supported by frame members 326 and 386. Shaft 384 is driven through bevel gears 388, 390 from the shaft 164 which is mounted on the mobile apparatus. Positioned rearwardly of each of conveyors 370 and 380 are the inclined belt conveyors 86, 88 for transferring harvested tobacco leaves from the slat conveyors 370, 380 to receptacles 190. Suitable sprockets 392 or the like are provided on each of shafts 368, 378, 382 and 384 for supporting and driving the conveyors 370, 380. Variations in the means for driving the conveyors are contemplated within the scope of the invention. It is to be understood that the top runs of leaf conveyors 370, 380 are at an elevation above the fingers 354 and only slightly below the elevation of frame members 326 and 328, as shown by FIG. 17.

A fluid system or means is employed for properly orienting the tobacco leaves 28 during harvesting and for causing them to be arranged generally uniform on the conveyors 370 and 380 after harvesting. Elongated nozzle slots 394, 396 are formed in frame members 326 and 328, respectively, with slot 394 laterally opposite the diagonal harvesting arm 330 of frame 328 and the slot 396 laterally opposite the arm 330 of frame 326. Both of these slots communicate with air supply lines 398 leading to any suitable source of air pressure on the mobile apparatus. Nozzle slots 394, 396 are angled an approximately 45° to the vertical so that air emitted from the slots is directed upwardly and inwardly at about 45 degrees beneath the tobacco leaves 28 as shown in FIG. 17. This assures that the leaves being harvested are supported at about 45° and do not droop or sag during harvesting by arms 330.

Additionally, a large rectangular suction head or box 400 is positioned directly under the slatted upper runs of conveyors 370 and 380 laterally opposite the two arms 330 for drawing detached leaves downwardly by suction onto the conveyors in a roughtly consistent manner with a majority of the leaf stems projecting in the same direction. The suction heads 400 coact with the positive pressure nozzle slots 394, 396 in positioning the leaves on the conveyors. The suction heads 400 are connected with flexible conduits 402 leading to a suitable source of suction 222, 220, 216 on the mobile frame.

The arms 330 disclosed in FIGS. 15-20 will remove leaves around the full circumference of the plants at the particular elevation of the arms and their leaf removing elements 346, 348. The frame members 326 and 328 may be adjusted vertically by raising or lowering support bars 106 through racks 108, 124, gear 110 and cylinder 126, so that the harvesting arms 330 may be disposed at different heights to harvest leaves over a considerable portion of the plant height. Additionally, the units 326 and 328 are mounted for swinging movement due to the hinged connection between the segments 105 and 107 of bars 106.

The apparatus of FIGS. 15-20 functions in the following manner. As the apparatus 20 traverses a plant row so that plants enter between frame members 326 and 328, the frame members are positioned at the proper height whereby elements 346 and 348 may engage the stems of the leaves to be harvested. Air pressure is supplied through the conduits 398 and suction to the conduits 402. The conveyors 370 and 380 have their top runs moving rearwardly and the stabilizing fingers 354 and flexible conveyor element 352 traveling rearwardly in the unobstructed passage between frames 326 and 328 at a speed equal and opposite to the forward movement of the mobile apparatus. The flexible conveyor element 352 and fingers 354 therefore have zero velocity with respect to the plant stalks 30 which they tend to engage, support and hold steady.

The opposing air streams from slots 394 and 396 maintain substantially all of the plant leaves elevated and supported at approximately 45° during the harvesting operation. Likewise, the suction heads 400 continuously operate to suck the severed leaves down onto the conveyors 370 and 380 and to orient the leaves thereon.

Particular reference is made to FIGS. 18-20 which depict the steps of harvesting the leaves around the full circumference of a plant 22A. FIG. 18 shows a first portion of a cycle where the plant stalk 30 has engaged the shallow recess 336 of the leading arm 330 during forward movement of the apparatus and the arm has swung rearwardly somewhat on its pivot 332, the stalk now beginning to engage the straight edge portion 338. The element or knife 346 in a plane just above the arm proper is about to sever or remove the leaf 28 with a combined cutting and breaking operation of the leaf stem.

Referring to FIG. 19, the leaf 28A has been removed and the plant stalk 30 has entered the abrupt recess 340 of the harvesting arm and passed over the corner or shoulder 342. In passing over the shoulder, the second knife element 348 has sprung forwardly slightly severing and removing leaf 28B.

FIG. 20 shows the condition where the plant stalk 30 has not tripped over the cam extension 344 of the leading arm 330 and the plant 22A has cleared the leading arm and the spring 334 of the leading arm 330 has automatically returned it to the original or normal position so that the arm is now ready to engage the next plant 22B. Plant 22A has now been engaged by the second or rearward harvesting arm 330 and has passed beyond the recess 336 and onto the straight edge portion 338 and the knife element 346 is coming into play to sever another leaf from the main stalk on another circumferential portion of the plant. After further forward progress of the apparatus, the knife element 348 will be activated as the plant stalk 30 enters the recess 340 and any remaining leaf at this portion of the circumference will be severed and removed. After clearing plant 22A, the rearward arm 330 will return to its normal diagonal position under the influence of spring 334.

In effect, leading arm 330 functions in two stages to remove leaves from approximately 180° of the stalk circumference. Immediately following this, the rear arm 330 comes into play in two stages to remove leaves from the remainder of the plant circumference. Only the first stage of operation of the rear arm as shown in FIG. 20, the second stage occurring when stalk 30 drops into recess 340. The first stage of operation activates knife element 346 and the second stage activates knife element 348.

As the leaves are removed from the standing plants by the operation of arms 330, the combined action of air streams from nozzle slots 394, 396 and the suction through suction 400 tends to deliver the severed leaves from the respective sides of the plants onto the side conveyors 370 and 380 in an oriented manner. Each suction head 400 has this entire top area or mouth open directly beneath the slatted conveyor elements. This orientation is not perfect but is approximate and sufficient to be practical in the total process of harvesting the tobacco leaves and conveying to receptacles 190 in an orderly fashion with the elimination of manual labor. Two of the most important features of the embodiment of FIGS. 15-20 are, first, the unique coaction of arms 330 for removing leaves from the entire circumference of the plants, and, second, the coaction with the arms 330 of the positive pressure and suction air streams to support and orient the leaves as they are being severed by the arms and to convey them to conveyors 370 and 380 in a generally uniform manner, as previously indicated.

As shown by the arrows of FIGS. 18-20, the severed leaves are affected by the pressure air streams from slots 394 and 396 and tend to be pushed by these air streams toward conveyors 370 and 380 on the far or remote sides of the harvester apparatus, where the suction heads 400 draw the harvested leaves onto the conveyors. This operation is not unfailing but a high percentage of the leaves act in this manner making the apparatus practical.

I claim:

1. A tobacco leaf harvesting and orienting apparatus comprising: supporting means adapted to traverse a row of standing tobacco plants, each plant including a main stalk and multiple leaves radiating from the main stalk around the circumference thereof, leaf removal means on said supporting means, and means cooperating with said removal means for pre-positioning predesignated leaves for contact with said leaf removal means immediately prior to their removal from the stalk, said means for prepositioning the leaves including fluid means for orienting the leaves in a prescribed manner before being removed from the main stalks.

2. A tobacco leaf harvesting and orienting apparatus as defined in claim 1, wherein said supporting means includes a movable frame having a plurality of said leaf removal means positioned thereon for traversing opposed portions of each plant in the plant rows.

3. A tobacco leaf harvesting and orienting apparatus as defined in claim 1, said leaf removal means including at least one member displaceable relative to said supporting means for stripping a leaf adjacent the plant stalk.

4. A tobacco leaf harvesting and orienting apparatus as defined in claim 1, further including conveyor means for displacing the stripped tobacco leaves from said leaf removal means to a leaf collection receptacle where the leaves are deposited in an orderly fashion with the stems facing generally in the same direction.

5. A tobacco leaf harvesting and orienting apparatus as defined in claim 1, wherein said leaf removal means includes carrier means for displacing the harvested leaves in a prescribed path to a collection area.

6. A tobacco leaf harvesting and orienting apparatus as defined in claim 1, wherein said leaf removal means includes an angularly displaceable member having at least one leaf stem engaging element secured thereto for stripping the leaves from the main stalks.

7. A tobacco leaf harvesting and orienting apparatus as defined in claim 1, further including means cooperating with said leaf removal means for adjustably positioning said leaf removal means at various elevations on the plants to remove leaves substantially throughout the entire height of the plants.

8. A tobacco leaf harvesting and orienting apparatus as defined in claim 1, and further including means mounting said leaf removal means for displacement transversely of a row of tobacco plants upon traverse of said supporting means along the row.

9. A tobacco leaf harvesting and orienting apparatus as defined in claim 1, said leaf removal means including at least one pair of conveyor belts having opposed runs inclined downwardly with respect to the plants and the support means for gripping therebetween and stripping the tobacco leaves from the plant stalks.

10. A tobacco leaf harvesting and orienting apparatus as defined in claim 9, said fluid means including fluid suction means for extending a leaf beyond one side of the main stalk and into engagement with at least one of said belts.

11. A tobacco leaf harvesting and orienting apparatus as defined in claim 1, further including means located below said leaf removal means for engaging the lowermost portions of the stalks for stabilizing the plant stalks as said supporting means traverses a row of standing plants.

12. A tobacco leaf harvesting and orienting apparatus as defined in claim 11, and means for driving said stabilizing means at substantially zero velocity relative to the plant stalks as said supporting means traverses a plant row.

13. A tobacco leaf harvesting and orienting apparatus as defined in claim 11, said stabilizing means comprises endless belt means positioned to frictionally engage the plant stalks.

* * * * *